(12) United States Patent
Medioni et al.

(10) Patent No.: US 8,351,649 B1
(45) Date of Patent: Jan. 8, 2013

(54) VIDEO FEED TARGET TRACKING

(75) Inventors: Gerard Medioni, Los Angeles, CA (US); Qian Yu, Plainsboro, NJ (US); Thang Ba Dinh, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 920 days.

(21) Appl. No.: 12/416,913

(22) Filed: Apr. 1, 2009

Related U.S. Application Data

(60) Provisional application No. 61/041,542, filed on Apr. 1, 2008.

(51) Int. Cl.
*G06K 9/00* (2006.01)
(52) U.S. Cl. ...................................................... 382/103
(58) Field of Classification Search .................. 382/100, 382/103
See application file for complete search history.

(56) References Cited

U.S. PATENT DOCUMENTS

| | | | | |
|---|---|---|---|---|
| 7,602,944 | B2 * | 10/2009 | Campbell et al. | 382/103 |
| 7,756,296 | B2 * | 7/2010 | Porikli et al. | 382/103 |
| 8,135,221 | B2 * | 3/2012 | Jiang et al. | 382/224 |
| 2005/0226464 | A1 | 10/2005 | Sun et al. | |
| 2006/0036399 | A1 | 2/2006 | Yang et al. | |
| 2007/0101269 | A1 * | 5/2007 | Hua et al. | 715/723 |

OTHER PUBLICATIONS

Feng Tang et al: "Co-Tracking Using, Semi-Supervised Support Vector Machines" Computer Vision, 2007. ICCV 2007. IEEE IIth International Conference 0 N, IEEE, PO, Oct. 1, 2007, pp. 1-8, XP031194443, ISBN: 978-1-4244-1630-1.

Kuang-Chih Lee et al: "Online Learning of Probabilistic Appearance Manifolds for Video-Based Recognition and Tracking", Computer Vision and Pattern Recognition, 2005 IEEE Computer Society Conference on, IEEE, Piscataway, NJ, USA, vol. 1, Jun. 20, 2005, pp. 852-859, XP010817361, DOI: D01:10.1109/CVPR.2005.260, ISBN: 978-0-7695-2372-9 the whole document.
Qian, Yu, "Online Tracking and Reacquisition Using Co-Trained Generative and Discriminative Trackers", Computer Vision ECCV 2008, (Lecture Notes in Computer Science), Springer Berlin Heidelberg, Berlin, Heidelberg, vol. 5303, Oct. 12, 2008, pp. 678-691, XP019109234, ISBN: 978-3-540-88685-3.
Reise, Franck, Authorized Officer, European Patent Office, PCT International Application No. PCT/US2009/039214, in International Search Report, mailed Feb. 28, 2011, 15 pages.
Ross et al., "Incremental Learning for Robust Visual Tracking," Int. J. Comput. Vis. (2008) 77:125-141 (published online on Aug. 17, 2007), 17 pages.

(Continued)

*Primary Examiner* — Bhavesh Mehta
*Assistant Examiner* — Shefali Goradia
(74) *Attorney, Agent, or Firm* — Fish & Richardson P.C.

(57) ABSTRACT

Technologies for object tracking can include accessing a video feed that captures an object in at least a portion of the video feed; operating a generative tracker to capture appearance variations of the object operating a discriminative tracker to discriminate the object from the object's background, where operating the discriminative tracker can include using a sliding window to process data from the video feed, and advancing the sliding window to focus the discriminative tracker on recent appearance variations of the object; training the generative tracker and the discriminative tracker based on the video feed, where the training can include updating the generative tracker based on an output of the discriminative tracker, and updating the discriminative tracker based on an output of the generative tracker; and tracking the object with information based on an output from the generative tracker and an output from the discriminative tracker.

32 Claims, 11 Drawing Sheets

OTHER PUBLICATIONS

Roth et al., "Conservative Visual Learning for Object Detection with Minimal Hand Labeling Effort", Jan. 1, 2005, Pattern Recognition Lecture Notes in Computer Science; LNCS, Springer, Berlin, DE, vol. 3663, pp. 293-300, 8 pages.

Avidan, S., "Ensemble tracking," IEEE Computer Society Conference on Computer Vision and Pattern Recognition (CVPR), vol. 2, pp. 494-501, 2005.

Avidan, S., "Support Vector Tracking," IEEE Transactions on Pattern Analysis and Machine Intelligence (PAMI), vol. 26, No. 8, pp. 1064-1072 (2004).

Bjoerck, A. and G.H. Golub, "Numerical methods for computing angles between linear subspaces," Mathematics of Computation, vol. 27, No. 123, pp. 579-594 (Jul. 1973).

Black, M.J. and A.D. Jepson, "EigenTracking: Robust Matching and Tracking of Articulated Objects Using a View-Based Representation," International Journal of Computer Vision, vol. 26, No. 1, pp. 63-84 (1998).

Blum, A. and T. Mitchell., "Combining Labeled and Unlabeled Data with Co-Training," Annual Workshop on Computational Learning Theory, Proceedings of the eleventh annual conference on Computational learning theory (COLT 98), Madison, WI, USA, pp. 92-100 (1998).

Bordes, A. et al., "Fast kernel classifiers with online and active learning," Journal of Machine Learning Research, 6: 1579-1619 (2005).

Cauwenberghs, G. and T. Poggio, "Incremental and Decremental Support Vector Machine Learning," Advances in Neural Information Processing Systems (NIPS) 13, Proceedings of the 2000 Conference, T.K. Leen et al. (Eds.), Cambridge, Massachusetts: The MIT Press, pp. 409-415, 2001.

Collins, R.T., "Online selection of discriminative tracking features," IEEE Transactions on Pattern Analysis and Machine Intelligence (PAMI), vol. 27, No. 10, pp. 1631-1643, (Oct. 2005).

Dalal, N. and B. Triggs, "Histograms of oriented gradients for human detection," Proceedings of the 2005 IEEE Computer Society Conference on Computer Vision and Pattern Recognition (CVPR'05), pp. 886-893, 2005.

DeGroat, R.D. and R. Roberts, "Efficient, Numerically Stabilized Rank-One Eigenstructure Updating," IEEE Transaction on Acoustics, Speech, and Signal Processing, vol. 38, No. 2, pp. 301-316, (Feb. 1990).

Elgammal, A., "Learning to track: Conceptual Manifold Map for Closed-form Tracking," Proceedings of the 2005 IEEE Computer Society Conference on Computer Vision and Pattern Recognition (CVPR'05), vol. 1, pp. 724-730, (Jun. 2-25, 2005).

Grabner, M. et al., "Learning Features for Tracking," IEEE Conference on Computer Vision and Pattern Recognition (CVPR'07), Minneapolis, MN, Jun. 17-22, 2007, pp. 1-8.

Hall, P. et al., "Merging and Splitting Eigenspace Models," IEEE Transactions on Pattern Analysis and Machine Intelligence (PAMI), vol. 22, No. 9, pp. 1042-1049 (Sep. 2000).

Ho, J. et al., "Visual Tracking Using Learned Subspaces," Proceedings of the 2004 IEEE Computer Society Conference on Computer Vision and Pattern Recognition (CVPR '04), vol. 1, pp. 782-789, 2004.

Isard, M. and A. Blake, "Condensation—Conditional Density Propagation for Visual Tracking," International Journal of Computer Vision, vol. 29, No. 1, pp. 5-28 (1998).

Isard, M. and A. Blake, "Contour Tracking by Stochastic Propagation of Conditional Density," Computer Vision—ECCV'96, 4th European Conference on Computer Vision (ECCV), Berlin, Germany: Springer-Verlag, Cambridge, UK, Apr. 15-18, 1996, Proceeedings, vol. I, pp. 343-356, 1996.

Javed, O. et al., "Online Detection Classification of Moving Objects Using Progressively and Improving Detectors," Proceedings of the 2005 IEEE Computer Society Conference on Computer Vision and Pattern Recognition (CVPR'05), vol. 1, pp. 696-701, Jun. 20-25, 2005.

Jepson, A.D. et al., "Robust Online Appearance Models for Visual Tracking," IEEE Conference on Computer Vision and Pattern Recognition (CVPR), Kauai, Hawaii, Dec. 2001, vol. I, pp. I-415-I-422.

Kim, M., et al., "Face Tracking and Recognition with Visual Constraints in Real-World Videos," IEEE Conference on Computer Vision and Pattern Recognition (CVPR'08), Anchorage, AK, Jun. 23-28, 2008, pp. 1-8.

Lasserre, J.A. et al., "Principled hybrids of generative and discriminative models," Proceedings of the 2006 IEEE Computer Society Conference on Computer Vision and Pattern Recognition (CVPR'06), Jun. 17-22, 2006, pp. 87-94.

Lee, K.C. and D. Kriegman, "Online Learning of Probabilistic Appearance Manifolds for Video-based Recognition and Tracking," Proceedings of the 2005 IEEE Computer Society Conference on Computer Vision and Pattern Recognition (CVPR'05), vol. 1, pp. 852-859 (Jun. 20-25, 2005).

Levin, A. et al., "Unsupervised Improvement of Visual Detectors Using Co-Training," Proceedings of the Ninth IEEE International Conference on Computer Vision (ICCV), Nice, France, Oct. 13-16, 2003, pp. 626-633.

Li, Y. et al., "Tracking in Low Frame Rate Video: A Cascade Particle Filter with Discriminative Observers of Different Lifespans," IEEE Conference on Computer Vision and Pattern Recognition (CVPR. '07), pp. 1-8, 2007.

Lim, J. et al., "Incremental Learning for Visual Tracking," Advances in Neural Information Processing Systems (NIPS) 17: Proceedings of the 2004 Conference, L.K. Saul et al. (Eds.), Cambridge, Massachusetts: The MIT Press, pp. 793-800, 2005.

Lin, R.S. et al., "Adaptive Discriminative Generative Model and Its Applications," Advances in Neural Information Processing Systems (NIPS) 17: Proceedings of the 2004 Conference, L.K. Saul et al. (Eds.), Cambridge, Massachusetts: The MIT Press, pp. 801-808, 2005.

Liu, X. and T. Yu, "Gradient Feature Selection for Online Boosting," IEEE 11th International Conference on Computer Vision (ICCV 2007), Rio de Janeiro, Brazil, Oct. 14-21, 2007, pp. 1-8.

Moghaddam, B. and A. Pentland, "Probabilistic Visual Learning for Object Representation," IEEE Transactions on Pattern Analysis and Machine Intelligence (PAMI), vol. 19, No. 7, pp. 696-710 (Jul. 1997).

Ng, A.Y. and M.I. Jordan, "On Discriminative vs. Generative classifiers: A comparison of logistic regression and naive Bayes," Advances in Neural Information Processing Systems (NIPS) 14, vol. II: Proceedings of the 2002 Conference, T.G. Dietterich et al. (Eds.), Cambridge, Massachusetts: The MIT Press, pp. 841-848, 2002.

Nguyen, H.T. and A.W.M. Smeulders, "Robust Tracking Using Foreground-Background Texture Discrimination," International Journal of Computer Vision, vol. 69, No. 3, pp. 277-293, 2006.

Oza, N. C. and S. Russell, "Online Bagging and Boosting," Artificial Intelligence and Statistics, 2001: Proceedings of the Eighth International Workshop, T. Jaakkola et al. (Eds.), San Francisco, CA: Morgan Kaufmann Publishers, Jan. 4-7, 2001, Key West, Florida, pp. 105-112 (2001).

Platt, J.C., "Probabilities for SV Machines," Chapter 5 in *Advances in Large Margin Classifiers*, Alexander J. Smola et al. (Eds.), Cambridge, Massachusetts: The MIT Press, pp. 61-71, 2000.

Raina, R.. et al., "Classification with Hybrid Generative/Discriminative Models,". Advances in Neural Information Processing Systems (NIPS) 16, Proceedings of the 2003 Conference, S. Thrun et al. (Eds.), Cambridge, Massachusetts: The MIT Press, pp. 545-552, 2004.

Tang, F. et al., "Co-Tracking Using Semi-Supervised Support Vector Machines," IEEE 11th International Conference on Computer Vision (ICCV 2007), Oct. 14-21, 2007, pp. 1-8.

Tenenbaum, J.B. et al., "A Global Geometric Framework for Nonlinear Dimensionality Reduction," Science, vol. 290, No. 5500, pp. 2319-2323, 2000.

Vishwanathan, S.V.N., "Simple SVM," Proceedings, Twentieth International Conference on Machine Learning (ICML), T. Fawcett and N. Mishra 9(Eds.), Menlo Park, CA: AAAI Press, pp. 760-767, 2003.

Wu, B. and R. Nevatia, "Improving Part based Object Detection by Unsupervised, Online Boosting," IEEE Conference on Computer Vision and Pattern Recognition (CVPR), pp. 1-8, Jun. 17-22, 2007.

Yang, M. and Y. Wu, "Tracking Non-stationary Appearances and Dynamic Feature Selection," IEEE Computer Society Conference on Computer Vision and Pattern Recognition (CVPR'05), vol. 2, pp. 1059-1066, Jun. 2-25, 2005.

Yilmaz, A. et al., "Object Tracking: A Survey," ACM Comput. Surv., vol. 38, No. 4, Article 13, 45 pages, 2006.

Yu, Q. et al., "Online Tracking and Reacquisition Using Co-trained Generative and Discriminative Trackers," ECCV08, II: 678-691 (2008).

* cited by examiner

Online Subspace Learning Algorithm

Input: $(\mathcal{I}, \mathcal{M}, d_0, L)$
$\mathcal{I} = \{I_1, \ldots, I_n, \ldots\}$: a sequence of samples  $\mathcal{M} = \emptyset$: the appearance manifold
$d_0$: the initial dimension for each subspace  $L$: the maximum number of subspaces
Output: $\mathcal{M} = (\Omega_1, \ldots, \Omega_L)$: multi-local linear subspaces
while $\mathcal{I} \neq \emptyset$ do
  fetch $d_0 + 1$ samples and form a new subspace
  $\Omega_n \leftarrow (I_{d_0}, \ldots, I_{1+d_0})$
  if there exists an empty subspace then
    Add $\Omega_n$ to $\mathcal{M}$
  else
    $(p, q)^* = \arg\max Sim(\Omega_p, \Omega_q), p, q \in \{1, \ldots, L\}, p \neq q$
    $\Omega_m = \Omega_p \cup \Omega_q$ and replace $\Omega_p$ and $\Omega_q$ with $\Omega_m$
  end if
end while

FIG. 3A

| Online Subspace Learning Algorithm |
|---|
| Input: $(\mathcal{I}, \mathcal{M}, \lambda, d_l, d_u)$ |
| $\mathcal{I} = \{I_1, \cdots, I_n, \cdots\}$: a sequence of samples |
| $\mathcal{M} = \emptyset$: the appearance manifold |
| $d_l$: the initial dimension for each subspace |
| $\eta$: the threshold of subspace truncation |
| $d_u$: the maximum dimension allowed for each subspace |
| Output: $\mathcal{M} = (\Omega_1, \cdots \Omega_l)$: multi-local linear subspaces |
| while $\mathcal{I} \neq \emptyset$ do |
|     fetch $d_l + 1$ samples and form a new subspace |
|     $\Omega_n \leftarrow (I_i, \cdots, I_{i+d_l+1})$ |
|     if there exists an empty subspace then |
|         Add $\Omega_n$ to $\mathcal{M}$ |
|     else |
|         $(p, q)^* = \arg\min d(\Omega_p, \Omega_q), p, q \in [1, ..., l, n]$ |
|         if the minimum distance $\geq$ INF then |
|             $\Omega_m = \Omega_p \cup \Omega_q$ |
|             replace $\Omega_p$ and $\Omega_q$ with $\Omega_m$ |
|         else |
|             $d_u = d_u - 1$ |
|         end if |
|     end if |
| end while |

FIG. 3B

Online SVM Algorithm
------
Input: $(\mathcal{I}, \mathcal{C}, t)$
$\mathcal{I} =: \{I_1, \cdots, I_n, \cdots\}$: a sequence of samples
$\mathcal{C} =:$ the seed classifier
$t$: the finishing cycle
Output: $\mathcal{C} =:$ the online trained classifier
while $\mathcal{I} \neq \emptyset$ do
   1. Remove old ignored vectors
   2. Remove old SVs and REPROCESS in all vectors
   3. Fetch a new sample $(I_i)$ and do PROCESS$(I_i)$
   4. Do REPROCESS once in SVs
   5. Do finishing every $t$ frames
end while

FIG. 4

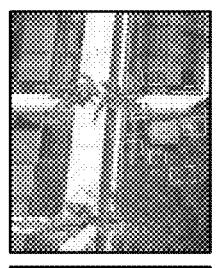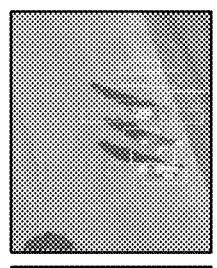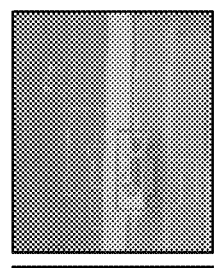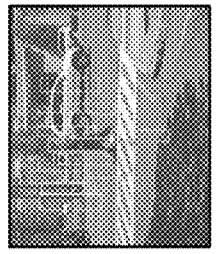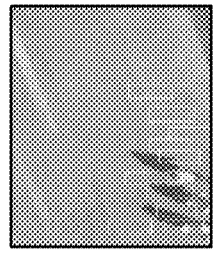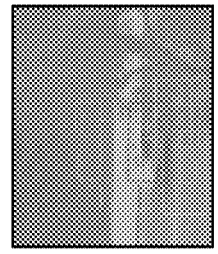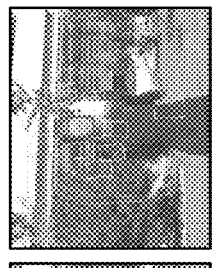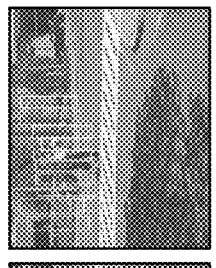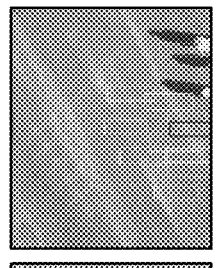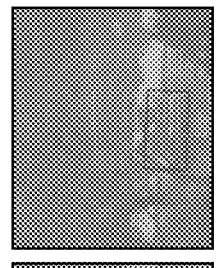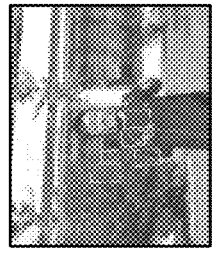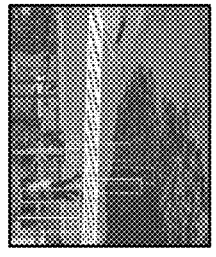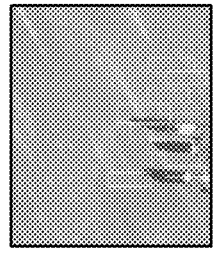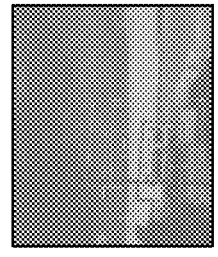
FIG. 6A  FIG. 6B  FIG. 6C  FIG. 6D

VIDEO FEED TARGET TRACKING

PRIORITY CLAIM

This application claims the benefit of U.S. Provisional Application No. 61/041,542 entitled "VIDEO FEED TARGET TRACKING" and filed on Apr. 1, 2008, which is incorporated by reference as part of the disclosure of this document.

FEDERALLY SPONSORED RESEARCH OR DEVELOPMENT

This invention was made with government support under Contract No. W911NF-07-1-0044 awarded by the Army Research Office. The government has certain rights in the invention.

BACKGROUND

This application relates to tracking one or more objects in a video feed.

Visual surveillance can include monitoring one or more video feeds. A video feed can capture an object moving through space and time. The object can be, for example, a human or a moving object such as a vehicle. The object can come in and out of view in the video feed and can change in appearance. The object can be identified as a target of interest and tracked. The object can be tracked through space and time.

SUMMARY

This application describes technologies, among other things, for object tracking.

In one aspect, techniques, apparatuses, systems, and computer program products for object tracking can include accessing a video feed that captures an object in at least a portion of the video feed; co-training separate appearance models with the video feed, the models comprise a generative model to capture appearance variations of the object in the video feed and a discriminative model to discriminate the object from the object's background as captured by the video feed; using a sliding window to process data from the video feed; advancing the sliding window to focus the discriminative model on recent appearance variations of the object in the video feed; generating object information corresponding to the object based a Bayesian framework that combines likelihood function outputs corresponding to the generative model and the discriminative model; updating the generative model and the discriminative model using the object information; and tracking the object based on the object information. The object information can include position, size, and rotation information.

In another aspect, techniques, apparatuses, systems, and computer program products for object tracking can include accessing a video feed that captures an object in at least a portion of the video feed; operating a generative tracker to capture appearance variations of the object in the video feed; operating a discriminative tracker to discriminate the object from the object's background as captured by the video feed, where operating the discriminative tracker can include using a sliding window to process data from the video feed, and advancing the sliding window to focus the discriminative tracker on recent appearance variations of the object in the video feed; training the generative tracker and the discriminative tracker based on the video feed, where the training can include updating the generative tracker based on an output of the discriminative tracker, and updating the discriminative tracker based on an output of the generative tracker; and tracking the object based on an output from the generative tracker and an output from the discriminative tracker.

These and other implementations can include one or more of the following features. Implementations can include operating the discriminative tracker to use information based on an output of the generative tracker to reacquire the object in the video feed after an occlusion of the object in video feed or change in viewpoint or illumination of the video feed; and operating the generative tracker to use information based on an output of the discriminative tracker to focus on the object. Operating a generative tracker can include generating a compact representation of a complete appearance of the object based on linear subspaces to represent appearance variations of the object, where the linear subspaces are updated adaptively using an online learning algorithm. Operating a generative tracker can include generating subspaces, using samples of the video feed, to represent appearance variations of the object in the video feed; determining similarities between the subspaces; and selectively merging two or more of the subspaces based on an output of the determination to reduce a number of subspaces representing the object. Operating the discriminative tracker can include using an online support vector machine algorithm with local feature descriptors, e.g., local gradient and shape features or Histogram of Gradient (HoG) features, to focus on appearance variations of the object that occur within the sliding window. Operating the discriminative tracker can include updating an object model trained by the online support vector machine algorithm based on samples of the video feed; and removing samples that fall outside of the sliding window from consideration by the online support vector machine algorithm. Features can include using a Bayesian framework to combine outputs of the generative tracker and discriminative tracker; and generating object information corresponding to the object based on the combined outputs, where tracking the object can include using the object information. Features can include operating a video capture device to generate the video feed; and using the object information to move the video capture device. The object information can include position, size, and rotation information.

In another aspect, techniques, apparatuses, systems, and computer program products for object tracking can include accessing a video feed that captures an object; operating a generative tracker to generate a compact representation of a complete appearance of the object using a number of local linear subspaces that represent appearance variations of the object, wherein the linear subspaces are updated adaptively using an online learning algorithm; operating a discriminative tracker that uses an online support vector machine (SVM) algorithm to focus on local appearance of the object and discriminates the object from distracters in the object's background as captured by the video feed; training the generative tracker together with the discriminative tracker incrementally during the video feed in a Bayesian framework; and tracking the object using the generative tracker and the discriminative tracker.

In another aspect, a system for object tracking can include a video camera that generates a video feed, a controller to move the video camera in space; and a processor to execute instructions that include obtaining the video feed, wherein the video feed captures an object; operating a generative tracker to generate a compact representation of a complete appearance of the object using a number of local linear subspaces that represent appearance variations of the object, wherein the linear subspaces are updated adaptively using an online learning algorithm; operating a discriminative tracker that uses an online support vector machine (SVM) algorithm to focus on local appearance of the object and discriminates the object from distracters in the object's background as captured by the video feed; training the generative tracker together with the discriminative tracker incrementally during the video feed in a Bayesian framework; and generating instructions for the controller using the generative tracker and the discriminative tracker. The generated instructions can include instructions to move the video camera such that the video camera tracks the object. The controller can be responsive to the generated instructions.

In another aspect, a system for object tracking can include a video capture device to generate a video feed; and a processor module, in communication with the video capture device, configured to perform operations. The operations can include accessing the video feed, where the video feed captures an object in at least a portion of the video feed; operating a generative tracker to capture appearance variations of the object in the video feed; operating a discriminative tracker to discriminate the object from the object's background as captured by the video feed, where operating the discriminative tracker includes using a sliding window to process data from the video feed, and advancing the sliding window to focus the discriminative tracker on recent appearance variations of the object in the video feed; and training the generative tracker and the discriminative tracker based on the video feed, where the training includes updating the generative tracker based on an output of the discriminative tracker, and updating the discriminative tracker based on an output of the generative tracker; and tracking the object based on an output from the generative tracker and an output from the discriminative tracker. The system can include an actuator to move the video camera in space; and a controller to operate the actuator and in communication with the processor module. The operations can include operating the controller to move the video camera to track the object using an output of the generative tracker and an output of the discriminative tracker.

Particular implementations of the subject matter described in this patent application can be implemented to realize one or more of the following potential advantages. Online co-training of generative and discriminative trackers can account for appearance changes and avoids drift and can reacquire an object after total occlusion. Other advantages can include tracking an object with large viewpoint variations and illumination changes and can track an object in clutter with distracters in background.

These and other aspects and their implementations are set forth in the accompanying drawings, the description, and the claims.

BRIEF DESCRIPTION OF THE DRAWINGS

FIGS. 3A, 3B show different examples of online subspace learning algorithms.

FIG. 4 shows an example of an online Support Vector Machine algorithm.

FIGS. 6A, 6B, 6C, 6D show different tracking examples using an online co-training architecture.

Like reference symbols in the various drawings indicate like elements.

DETAILED DESCRIPTION

Figure 1:
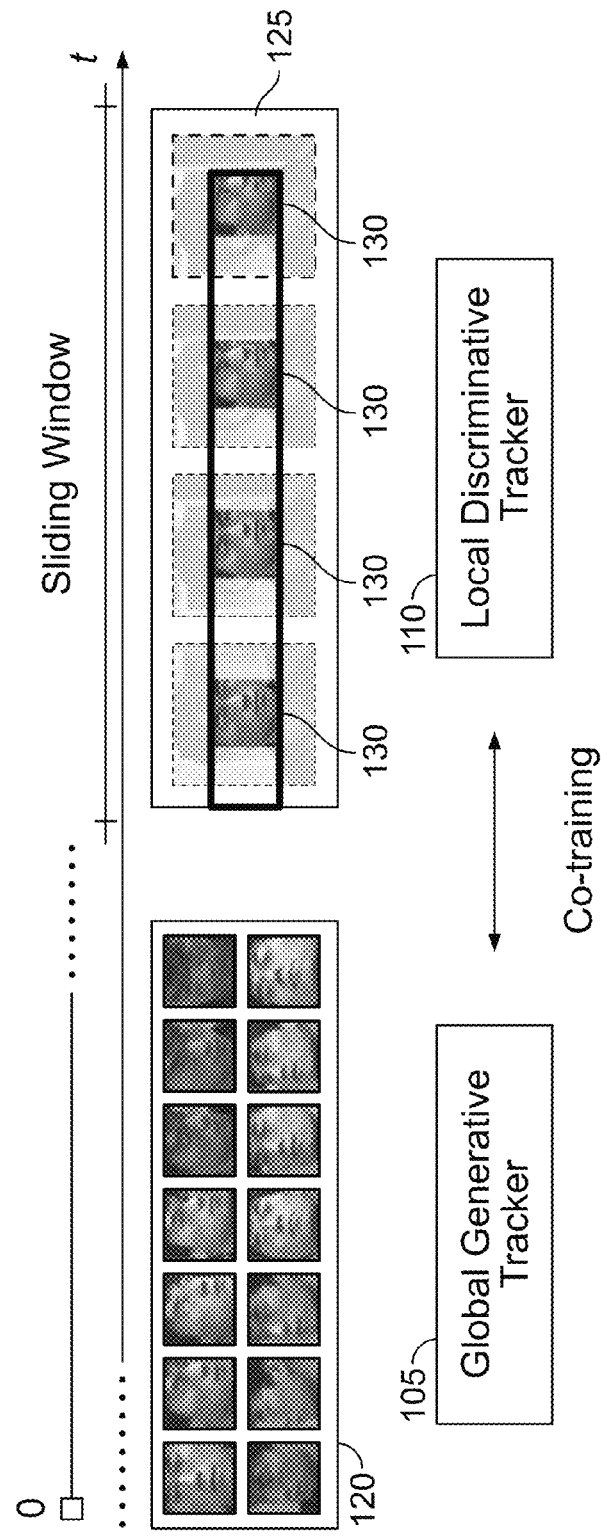
FIG. 1 shows an example of an online co-training architecture.

Object tracking is a challenging problem, as an object may change its appearance due to viewpoint variations, illumination changes, and occlusion. Also, an object may leave the field of view or be occluded and then reappear. Appearance can also change relative to background due to the emergence of clutter and distracters.

This tracking problem can be formulated in different ways including generative and discriminative. Generative tracking methods can learn a model to represent the appearance of an object. Tracking is then expressed as finding the most similar object appearance to the model. Several examples of generative tracking algorithms include Eigentracking (Black, M. J., Jepson, A. D.: "Eigentracking: Robust matching and tracking of articulated objects using a view-based representation" in IJCV. vol 26. 1998 63-84), WSL tracking (Jepson, A. D., Fleet, D. J., El-Maraghi, T. F.: "Robust online appearance models for visual tracking" in: CVPR. 2001), and IVT (Lim, J., Ross, D., Lin, R., Yang, M.: "Incremental learning for visual tracking" in NIPS. 2004 793-800). Multiple subspaces and non-linear manifold learning methods can address highly non-linear characteristics of appearance variations.

Instead of building a model to describe the appearance of an object, discriminative tracking methods can find a decision boundary that can best separate the object from the background. Examples of discriminative trackers can include those presented in Avidan, S.: "Ensemble tracking" in CVPR. vol 2. 2005 494-501; Collins, R. T., Liu, Y., Leordeanu, M.: "Online selection of discriminative tracking features" in PAMI. vol 27. 2005 1631-1643; and Nguyen, H. T., Smeulders, A. W.: "Robust tracking using foreground-background texture discrimination" in IJCV 2006. Support Vector Tracking (SVT) (Avidan, S.: "Support vector tracking" in PAMI (2004)) integrates an offline trained Support Vector Machine (SVM) classifier into an optic-flow-based tracker. Discriminative tracking methods can include online learning techniques to update the decision boundary according to new smaples and background. Some methods build a confidence map by finding the most discriminative RGB color combination in each frame. However, a limited color feature pool may restrict the discriminative power of this method. In "Ensemble tracking," Avidan proposes to use an ensemble of online learned weak classifiers to label a pixel as belonging to either the object or the background. To accommodate object appearance changes, at every frame, new weak classifiers replace part of old ones that do not perform well or have existed longer than a fixed number of frames. Some methods can use features at the pixel level and rely on a mode seeking process, e.g., mean shift, to find the best estimate on a confidence map, which restricts the reacquisition ability of these methods. Some methods include an online boosting algorithm, which is applied to the visual tracking problem. Thus, for tracking methods based on online boosting, it may be difficult to generalize to arbitrary object types.

Discriminative classifiers may outperform generative models if enough training data is available. However, generative methods may have better generalization performance when the size of training data is small. Specifically, a simple generative classifier such as one using naive Bayes may outperforms its discriminative counterpart such as one using logistic regression when the amount of labeled training data is small. Hybrid discriminative generative methods can imbue generative methods with the discriminative power via "discriminative training" of a generative model. These methods train a model by optimizing a convex combination of the generative and discriminative log likelihood functions. Due to the asymmetry in training data, "discriminative training" of a generative model requires a parameter to govern the trade-off between generative and discriminative. Moreover, an improper hybrid of discriminative generative model may generate worse performance than a pure generative or discriminative methods.

In review, there are several techniques to represent the appearance of an object for object tracking. One technique builds a generative model describing the visual appearance of the object. The tracking problem is then expressed as finding the most similar object appearance to the model in a maximum likelihood (ML estimate) or maximum-a-posterior (MAP estimate) formulation. Instead, discriminative formulation expresses tracking as a classification problem. Instead of trying to build a model to describe the object itself, discriminative methods aim to find a decision boundary that can best segment the object and the background. Since discriminative representation considers both object appearance and background information, it is more robust in avoiding distracters in the background. In order to deal with appearance changes, two strategies can be used: 1) global: a model which is able to cover appearance variations from different viewpoints, illumination conditions 2) local: a model which focuses on one type of appearance, or recent appearance of the target. A global model can provide a complete description of an object, thus allowing abrupt motion and reacquisition. From a generative point of view, a global appearance model from different viewpoints and illumination can be represented as an appearance manifold such as a non-linear appearance manifold. Learning the mapping from the input space to an embedded space or even evaluating whether a point in input space lies on the manifold is non-trivial. From a discriminative point of view, more appearance variations may increase the difficulty of the classification problem. For example, in a support vector machine (SVM) classification, to separate an object with many appearance variations from the background may require many support vectors and may cause the SVM training difficulty in converging.

One way to build a global model is to collect many appearance instances offline. However, offline collection of samples may require extra work and may perform poorly for unknown objects. In contrast, some online algorithms can build an appearance model on-the-fly and update the offline-built appearance model to adapt to current environments. The idea of incremental updating, which is very attractive for tracking general objects, can be applied to both generative and discriminative methods. Tracking algorithms can use appearance as the best estimation at the previous time to update the appearance model. This self-learning approach may reinforce the tracking errors and thus may cause the "drift" problem. As the online updating is an example of a semi-supervised learning problem, co-training can be used for solving such a semi-supervised training with limited labeled data. A co-training technique can use a consentient decision of a majority of independent trainees as a labeler and thus the trainees are able to train each other. The independence of trainees can be achieved by initializing with independent data sets or by using trainees which work on independent features.

Co-training techniques can include training two classifiers on two conditionally independent views of the same data and then use the prediction from each classifier to enlarge the training set of the other. Some co-training techniques can find an accurate decision boundary, starting from a small quantity of labeled data as long as the two feature sets are independent or nearly independent. Some co-training techniques can online train two SVM trackers with color histogram features and HOG features. These methods can use an incremental/decremental SVM solver to focus on recent appearance variations without representing the global object appearance.

This document describes technologies to track and reacquire an unknown object with limited labeling data. The technologies can learn changes in an object's appearance, e.g., viewpoint variations, illumination changes, or occlusion, online and build a model that describes seen appearances while tracking. The technologies can include a co-training based approach to continuously label incoming data and online update a discriminative-generative model. The generative model can use a number of low dimension linear subspaces to describe the appearance of an object. In order to reacquire an object, the generative model can encode the appearance variations that have been seen. In some implementations, a discriminative classifier can include an online support vector machine which can be trained to focus on recent appearance variations. The online co-training of this discriminative-generative approach can account for appearance changes, distracters in the object's background, and can reacquire an object after total occlusion.

FIG. 1 shows an example of an online co-training architecture. The online co-training architecture can include a global generative tracker 105 and a local discriminative tracker 110. The architecture can collaboratively combine generative and discriminative models with complementary views/features of the training data such as data based on a video feed. Further, the architecture can encode global object appearance variations of an object. As a result, the architecture can handle reacquisition of the object and can handle distracters in the background clutter.

A global generative tracker 105 can include a generative model to represent a global appearance of an object. The representations can include a number of low dimension subspaces to capture variations in object appearance. The generative model can encode the appearance variations that have been seen in a video feed in a compact way. For example, an online subspace updating algorithm can adaptively modify and/or merge subspaces. The generative tracker 105 can use global appearance information to prevent the tracking from drifting, and can handle reacquisition when an object disappears and reappears. The descriptive power of the generative model may increase as new samples are added.

A local discriminative tracker 110 can include a discriminative classifier. In some implementations, the discriminative tracker 110 can include an incrementally learned SVM classifier with histogram of gradient (HOG) features. The number of support vectors may grow rapidly when the appearance of object and background changes. Moreover, the adaption of the discriminative model to new appearance changes may become increasingly slower as samples are accumulated. To address these problems, the co-training architecture can decrementally train the discriminative tracker 110 to focus on recent appearance variations within a sliding window. For example, the co-training architecture can decrementally train a SVM based on the sliding window.

FIG. 1 additionally shows an example of the training data flow between trackers 105, 110. An online co-training technique can operate the trackers 105, 110 with different life spans. The global generative tracker 105 can use a group 120 of image patches. In some implementations, the group 120 can include all of the object appearance variations since tracking started. The discriminative tracker 110 can use a group 125 of images determined by a sliding window. For example, the discriminative tracker can use the last N captured video frames, such that a new frame pushes out the oldest frame in the group. The group 125 can include bounding boxes that indicate the positive and negative training samples within the sliding window used in the discriminative tracker 110. The discriminative tracker 110 can separate a region of interest such as image patches 130 in a frame of a video feed from the background. The generative tracker 105 can focus on these regions of interest.

In some implementations, an online co-training architecture can incrementally co-train both trackers 105, 110 in a Bayesian framework with limited initialization. The online co-training of the trackers can account for appearance changes and avoids drift. The cooperative nature of the dual trackers 105, 110 can allow for reacquisition of an object after total occlusion of an object. Using a Bayesian formulation, the visual tracking problem can be formulated as a state estimate problem. Given a sequence of observed image regions $O_t=(o_1, \ldots, o_t)$ over time t, a goal of visual tracking is to estimate the hidden state $s_t$. The hidden state can refer to an object's 2D position, scale and rotation. Assuming a Markovian state transition, the posterior can be formulated as a recursive equation $$p(s_t|O_t) \propto p(o_t|s_t) \int p(s_t|s_{t-1}) p(s_{t-1}|O_{t-1}) ds_{t-1} \quad (1)$$

where $p(o_t|s_t)$ and $p(s_t|s_{t-1})$ are the observation model and state transition model respectively. $p(s_{t-1}|O_{t-1})$, which is represented as a set of particles and weights, is the posterior distribution given all the observations up to time t-1. The recursive inference in Eq.1 is implemented with resampling and importance sampling processes such as those in Isard, M., Blake, A.: "Condensation—conditional density propagation for visual tracking" in IJCV 1998 5—28. In some implementations, the transition of the hidden state is assumed to be a Gaussian distribution as, $p(z_t|z_{t-1})=N(z_t; z_{t-1}, \Psi_t)$, where $\Psi_t$ is a time variant diagonal covariance matrix. In this recursive inference formulation, $p(o_t|s_t)$ is important for finding the ideal posterior distribution. $p(o_t|s_t)$ measures the likelihood of observing $o_t$ given one state of the object. In addition to a 2D position, the state variables can encode an object's rotation and scale. This may reduce the appearance variations caused by such motion at the price of that more particles are needed to represent the distribution.

The measurement of one observation comes from two independent models. One is a generative model such as a model based on online constructed multi-subspaces. The other is a discriminative model such as a model which is online trained with HOG features. The features used by these two models, such as intensity pattern and local gradient features, are complementary. In some implementations, after limited initialization, these two models are co-trained with sequential unlabeled data. Co-training can feature an automatic way to train with unlabeled data. In some implementations, each model can make the decision based on its own knowledge and this information is used to train the other model. The final decision is made by the combined hybrid model. Due to the independence between the two observers, an observation model $p(o_t|s_t)$ can be expressed as a product of two likelihood functions from the generative M model and the discriminative model C, $p(o_t|s_t) \propto p_M(o_t|s_t) p_C(o_t|s_t)$. Some implementations can adaptively adjust $\Psi_t$ in the state transition model according to the tracking result at time t. If neither of the models accepts the new unlabeled data, we increase the covariance matrix $\Psi_t$ and the number of samples. The extreme condition is that a very flat transition distribution is close to scanning the whole state space uniformly. This Bayesian formulation is very proper for the object tracking and reacquisition problem. By adaptively resampling, we can cover a large search region efficiently. Also, as partial appearance variations are compensated by the motion state, our method can deal with object rotation and scale changes.

Figure 2:
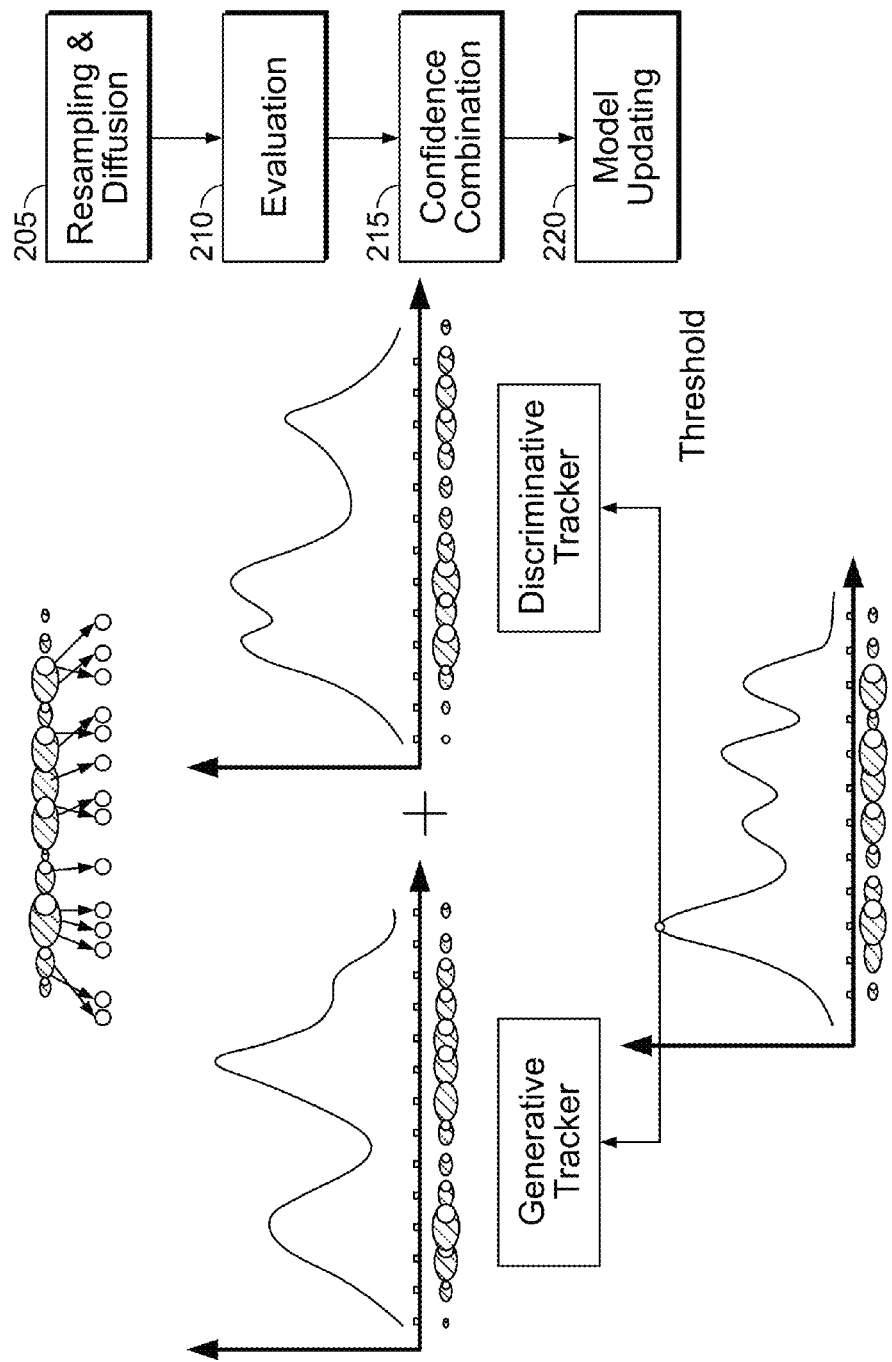
FIG. 2 shows a different example of an online co-training architecture.

FIG. 2 shows a different example of an online co-training architecture. An on-line co-training technique can include resampling & diffusion 205, evaluation 210, confidence combination 215, and model updating 220.

A generative tracker can use multiple linear subspaces to represent appearance variations. The global appearance of one object under different viewpoints and illumination conditions can lie on a low dimension manifold. However, such a global appearance manifold is highly non-linear. Although the appearance manifold is globally non-linear, the local appearance variations can still be approximated as a linear subspace. Thus, we incrementally learn a set of low dimension linear subspaces to represent the global appearance manifold.

Let $M=\{\Omega_1, \ldots, \Omega_L\}$ represent the appearance manifold of one object and $\Omega_l, l \in [1, \ldots, L]$ denote the local sub-manifold. An appearance instance x is a d-dimension image vector. Let $\Omega_l=(\hat{x}_l, U_l, \Lambda_l, n_l)$ denote one sub-manifold, where $\hat{x}_l$, $U_l$, $\Lambda_l$ and $n_l$ represent the mean vector, eigenvectors, eigenvalues and the size (number of samples) of the subspace respectively. Each subspace can represent the local appearance variations of objects such as variations due to viewpoint or illuminations changes. In some implementations, a η-truncation, such as $$m = \arg\min_i (\Sigma_i \lambda_i / tr(\Lambda) \geq \eta)$$

is used to truncate the subspaces where $\Lambda=\text{diag}(\lambda_1, \ldots, \lambda_n)$ with sorted eigenvalues of the subspace, $\lambda_1 \geq \lambda_2 \ldots \geq \lambda_n$.

From a statistical point of view, a subspace with m eigenbases can be regarded as a m-dimensional Gaussian distribution. Suppose $\Omega$ is a subspace with the first m eigenvectors, the projection of x on $\Omega$ is $y=(y_1, \ldots, y_m)^T=U^T(x-\hat{x})$. Then, the likelihood of x can be expressed as $$p(x|\Omega) = \left[ \frac{\exp\left(-\frac{1}{2}\sum_{i=1}^{m}\frac{y_i^2}{\lambda_i}\right)}{(2\pi)^{m/2}\prod_{i=1}^{m}\lambda_i^{1/2}} \right] \cdot \left[ \frac{\exp\left(-\frac{\varepsilon^2(x)}{2\rho}\right)}{(2\pi\rho)^{(d-m)/2}} \right] \quad (2)$$

where $\varepsilon=(x)=|x-UU^Tx|$ is the projection error, namely $L_2$ distance between the sample x and its projection on the subspace. In some implementations, the parameter $$\rho = \frac{1}{d-m} \sum_{i=m+1}^{d} \lambda_i.$$

In other implementations, the parameter $$\rho = \frac{1}{2}\lambda_{m+1}$$

as a rough approximation.

By using Eq. 2, we can evaluate the confidence of a sample from one subspace. A generative model can contain multiple subspaces (each subspace can be regarded as a hyper-ellipsoid), we maintain the neighborhood according to $L_2$ distance between the mean vectors of subspaces. To evaluate the confidence of one sample from such a generative model, we use the maximum confidence of the K-nearest (we use K=4 in experiments) neighboring subspaces.

FIG. 3A shows an example of an online learning algorithm used in some generative tracker implementations. An online learning algorithm can measure the similarity between subspaces and can merge subspaces to compact representations. Given that samples are given in a sequential way, the algorithm can learn the low dimension linear subspaces incrementally. In some implementations, a new subspace is created with $d_0$ dimension, namely $d_0+1$ sequential samples form a new subspace. Local smoothness is guaranteed by a small $d_0$. In some implementations, a new subspace is created and added into a subspace pool, and the closest subspaces are merged if they satisfy a condition for similarity. In order to represent a large number of sequential samples, some implementations can use a fixed number subspaces: if the number of subspaces exceeds a predetermined maximum, the most similar two subspaces are merged. In order to maintain the local property of the subspaces, merging can be limited to neighboring subspaces.

An online learning algorithm can merge two subspaces without storing sequential samples. Methods such as the one in Hall, P., Marshall, D., Martin, R.: "Merging and splitting eigenspace models" in IEEE PAMI. 2000 1042-1049 can incremental update eigenbases, however Hall's method takes into account the change of the mean of a subspace.

We summarize Hall's method by using scatter matrixes to simplify the representation. Suppose there are two subspaces $\Omega_1=(x_1,U_1,\Lambda_1,N)$ and $\Omega_2=(x_2, U_2, \Lambda_2, M)$, which we are attempting to merge to a new subspace $\Omega=(\bar{x},U,\Lambda,M+N)$. If the dimension of $\Omega_1$ and $\Omega_2$ are p and q, the dimension r of the merged subspace $\Omega$ satisfies: $\max(p,q) \leq r \leq p+q+1$. The vector connecting the centers of the two subspaces does not necessarily belong to either subspace. This vector causes the additional one in the upper bound of r.

It is easy to verify that the scatter matrix S of the merged subspace $\Omega$ satisfies, $$S = S_1 + S_2 + \frac{MN}{M+N}(x_1 - x_2)(x_1 - x_2)^T.$$

We aim to find a sufficient orthogonal spanning of S. Let $h_1(x)$ denote the residual vector of a vector x on $\Omega_1$, $h_1(x)=x-U_1U_1^Tx$. Note that $h_1(x)$ is orthogonal to $U_1$, i.e. $h(x)'U=0$. Now, $U'=[U_1,v]$ is a set of orthogonal bases to span the merged space, where $v=GS(h_1(U_2,(x_2-x_1)))$ and $GS(\bullet)$ denote the Gram-Schmidt process. Given the sufficient orthogonal bases, we can obtain the SVD decomposition of S.

$$U'^TSU' = \begin{bmatrix} \Lambda_1 & 0 \\ 0 & 0 \end{bmatrix} + \begin{bmatrix} G\Lambda_2 G^T & G\Lambda_2 \Gamma^T \\ \Gamma\Lambda_2 G^T & \Gamma\Lambda_2 \Gamma^T \end{bmatrix} + \frac{MN}{M+N}\begin{bmatrix} gg^T & g\gamma^T \\ \gamma g^T & \gamma\gamma^T \end{bmatrix} = R\Lambda R^T \quad (3)$$

where $G=U_1^T(x_2-x_1)$, $\Gamma=v^TU_2$, $g=U_1^T(x_2-x_1)$ and $\gamma=U'(x_2-x_1)$. Now, the eigenvalue of the merged subspace is $\Lambda$ in Eq. 3 and the eigenvector U is simply U'R. Note that incrementally updating a subspace with one observation is a special case of merging two subspaces using Eq. 3.

An online learning algorithm can determine the similarity between two subspaces. We use two factors to measure the similarity between two neighboring subspaces $\Omega_1, \Omega_2$, the canonical angles (principal angles) and the data-compactness.

Suppose the dimensions of two subspaces are $p, q, p \geq q$, then there are q canonical angles between the two subspaces. The algorithm can use a numerical stable algorithm to computes the angles between all pairs of orthonormal vectors of the two subspaces as, $\cos\theta_k=\sigma_k(U_1^TU_2), k=1,\ldots,q$, where $\sigma_k(\bullet)$ is the $k^{th}$ sorted eigenvalue computed by SVD. The consistency of two neighboring subspaces can be represented as follows.

$$\text{Sim}_1(\Omega_1, \Omega_2) = \prod_{k=q-d_0+1}^{q} \sigma_k(U_1^TU_2) \quad k=1,\ldots,q \quad (4)$$

As the dimensionality of subspaces is larger than $d_0$, the initial dimension, we select the $d_0$ largest principal angles, which approximately measure the angle between two local subspaces. In a 3D space, the largest canonical angle between two 2D subspaces is equivalent to the angle between the two planes. In this case, we prefer to merge 2D patches with a small plane-to-plane angle. Note that the merge only happens between neighbor subspaces. The neighborhood is defined according to the mean vector $L_2$ distance. Merging subspaces with a small principal angle can avoid destroying the local structure of the appearance manifold.

The other factor to consider is data-compactness, which measures how much extra dimensionality is incurred by a merge operation. Suppose the dimension of two subspaces $\Omega_1, \Omega_2$ is $p,q,p \geq q$, the sorted eigenavalues of original merged subspace are $\Delta_r=(\lambda_1,\ldots,\lambda_r)$, $r=p+q+1$. The similarity based on data-compactness is defined as $$\text{Sim}_2(\Omega_1,\Omega_2)\Sigma_{i=1}^p\lambda_i/\Sigma_{i=1}^r\lambda_i \quad (5)$$

If $\text{Sim}_2$ is close to one, this indicates the merge operation does not incur any new dimension; on the contrary, if $\text{Sim}_2$ is small, this indicates the variations in $\Omega_1$ and $\Omega_2$ cannot use common eigenvectors to represent it. Combining the two factors in Eq. 4 and Eq. 5, the final similarity between two subspaces is defined in Eq. 6.

$$\text{Sim}(\Omega_1,\Omega_2)=\text{Sim}_1(\Omega_1,\Omega_2)+w_d\text{Sim}_2(\Omega_1,\Omega_2) \quad (6)$$

where $w_d$ is the weight to balance these two factors. In some implementations, $w_d=0.2$.

FIG. 3B shows a different example of an online learning algorithm. Here, $$d(\Omega_1,\Omega_2)=d_1(\Omega_1,\Omega_2)+w_d d_2(\Omega_1,\Omega_2)$$

$$d_1(\Omega_1,\Omega_2)=\sqrt{1-\sigma_q^2(U_1^TU_2)}$$

$$d_2(\Omega_1, \Omega_2) = \frac{\sum_{i=p+1}^{r} \lambda_m^i}{\sum_{i=1}^{p} \lambda_m^i}$$

with $w_d=1.5$.

Figure 5B:
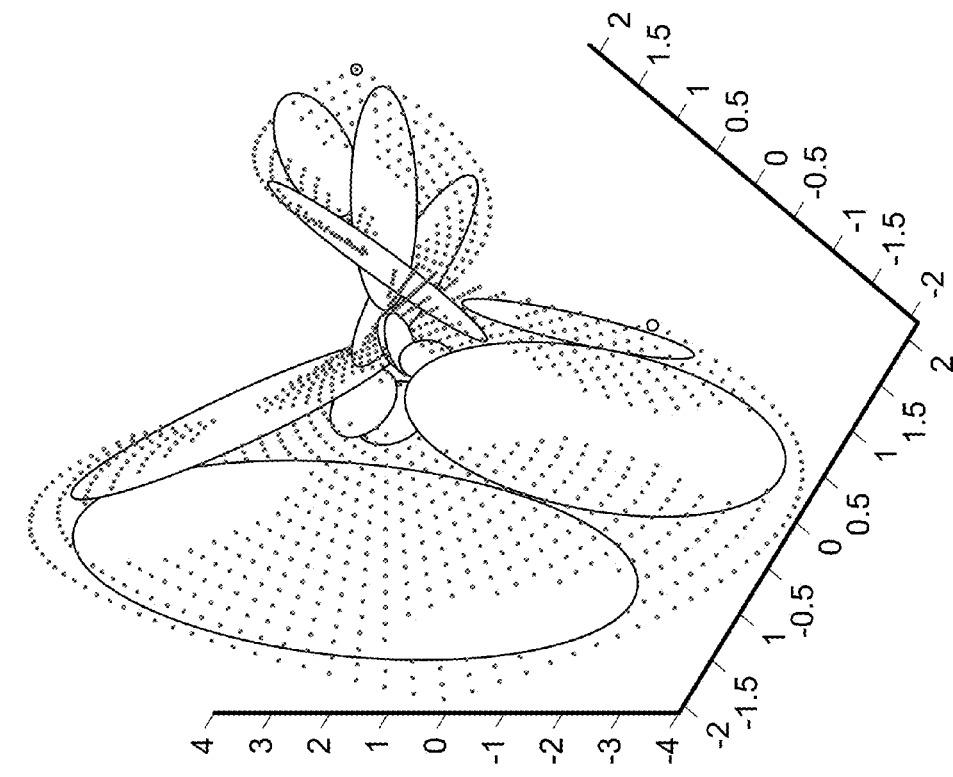
FIG. 5B shows an example of the final subspaces generated from a saddle like surface.
Figure 5A:
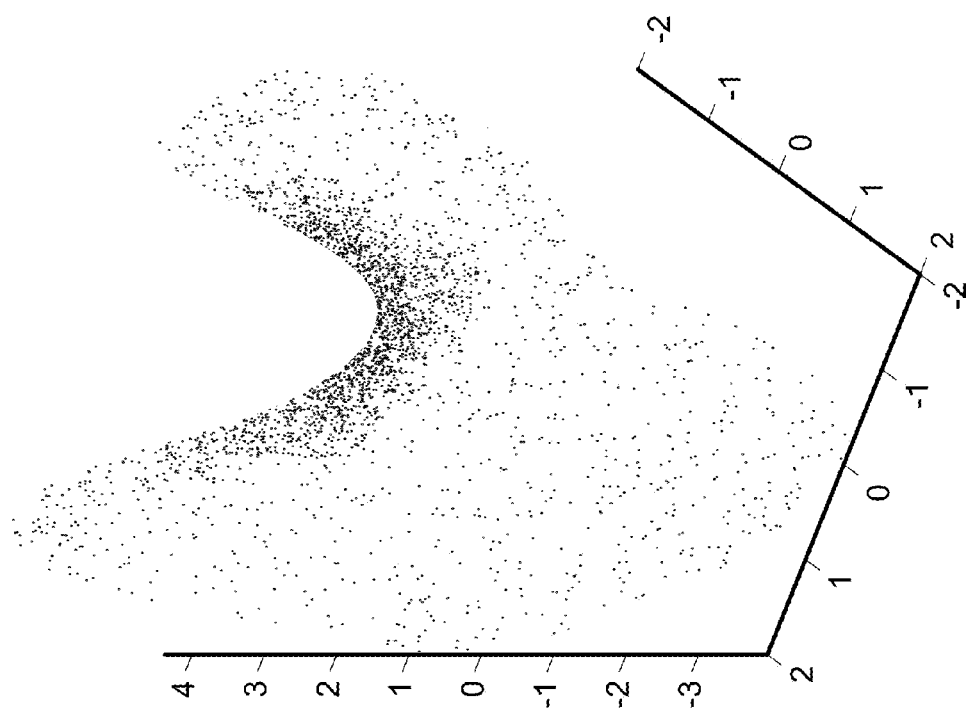
FIG. 5A shows an example of a saddle like surface.

FIGS. 5A, 5B shows an example of how an an online training process using incremental subspace updates can transform an input data set to a set of final subspaces. FIG. 5A shows an example of a saddle like surface generated with Gaussian noise. The 3D points in FIG. 5A are input into an online learning algorithm sequentially. Running the online learning algorithm can produce a final set of subspaces such as the ones shown in FIG. 5B. FIG. 5B shows an example of the final subspaces with $L=15, \eta=0.995$. In some implementaitons, the initial dimension $d_0$ is one. Although the online built subspaces depend on the order of the samples, a compact representation of the samples can be created as long as the data are input with local smoothness. The subspace updating operation may dominate the complexity of the generative tracker. Merging two subspaces with dimension p,q requires Golub-Reinsch SVD $O(r^3)$ of $r=p+q+1$ dimension square matrix. Since the dimension of each subspace is low, the total complexity is quite low. The low dimensionality of the local subspaces can guarantee both the local property and efficient computation.

A discriminative tracker such as a tracker using online SVM, may have better generalization performance than other discriminative methods on a small training set. In some implemenations, a discriminative tracker can include an incremental SVM algorithm such as LASVM (Bordes, A., Ertekin, S., JasonWeston, Bottou, L.: "Fast kernel classifiers with online and active learning" in JMLR 2005 1579-1619) to train a classifier between object and background. SVM can form the optimal separating function, which reduces to a linear combination of kernels on the training data, $f(x)\Sigma_j \alpha_j y_j K(x_j,x)+b$, with training samples $x_i$ and corresponding label $y_i=\pm 1$.

In practice, this is achieved by maximizing the dual objective function $\max_\alpha W(\alpha)$ with $$W(\alpha) = \sum_i \alpha_i y_i - \frac{1}{2}\sum_{i,j} \alpha_i \alpha_j K(x_i, x_j),$$

subject to $$\Sigma_i \alpha_i = 0, A_i \leq \alpha_i \leq B_i, \quad (7)$$

where $A_i=\min(0,Cy_i), B_i \max(0,Cy_i)$. Here, $\alpha$ is a vector of weights on $y_i$. A SVM solver can be regarded as updating $\alpha$ along some direction to maximize $W(\alpha)$. Let $g=(g_1, \ldots, g_n)$ denote the gradient of $W(\alpha)$ $$g_k = \frac{\partial W(\alpha)}{\partial \alpha_k} = y_k - \sum_i \alpha_i K(x_i, x_k) = y_k - \hat{y}(x_k) + b \quad (8)$$

LASVM suggests that optimization is faster when the search direction mostly contains zero coefficients. LASVM uses the search directions whose coefficients are all zero except for a single +1 and a single −1. The two non-zero coefficients, are called $\tau$-violating pair (i,j) if $\alpha_i<B_i, \alpha_j>A_j$, and $g_i-g_j>\tau$, where $\tau$ is a small positive value. and LASVM selects the $\tau$-violating pair (i,j) that maximizes the directional gradient $g_i-g_j$.

The LASVM algorithm contains two procedures named PROCESS and REPROCESS. When a new sample $x_k$ arrives, PROCESS forms a $\tau$-violating pair (i,j), which contains $x_k$ and another existing support vector, and updates the weights of this pair. Following PROCESS, REPROCESS selects a $\tau$-violating pair from the set of support vectors and updates their weights. The new sample $x_k$ may become a new support vector through PROCESS, while another support vector may need to switch out by REPROCESS. Both PROCESS and REPROCESS select $\tau$-violating pair with the largest gradient. The complexity of such a selection grows linearly with the number of vectors. A finishing step, which runs REPROCESS multiple times to further remove as many $\tau$-violating pairs as possible, is performed after online process. For tracking, the intermediate classifier is useful, hence some implementaitons can run this finishing step every 10 frames. Note that, since we do not need to look at the ignored vectors for incremental learning, $\tau$-violating pair is only selected from the set of support vectors.

For online tracking, many appearance variations and limited training samples may degrade the generalization ability of SVM. Further, the number of support vectors can grow rapidly when the appearance of an object and/or background changes. Thus, some implementations can decrementally train the SVM to focus on recent appearance variations within a sliding window.

In some implemetations, REPROCESS in LASVM can be used to achieve the "unlearning" of old samples. For decremental learning, removing ignored vectors (when ignored vectors move out of the sliding window) will not change the decision boundary. However, the removal of a support vector will affect the decision boundary and some ignored vectors may become support vectors. In order to remove one support vector, some implementations can first zero its coefficient and put its coefficient into the closest vector to keep the constraint in Eq. 7. Some implementations can apply REPROCESS multiple times to select $\tau$-violating pairs in set of both ignored and support vectors and update the weights. The cost of decremental learning is that we need to store all samples within a sliding window. The following describes examples of implementation settings, other settings are possible.

Some implementations can use image vectors of size 32×32 (for face) or 32×64 (for human and vehicle), for both generative and discriminative models. For the generative model, $\eta$ is set to 0.95-0.99 and the maximum number of subspaces is set to 5-10. The initial subspace dimension is 4, which is very low compared to the input space. Thus, some implemetations can form a new subspace every 5 frames, which is then inserted into the subspace pool. For the discriminative model, some implementations can use LASVM with R-HOG feature vectors, which are created from 16×16 blocks containing 8×8 cells. The strike size is 4 to allow overlapping HOG descriptors. Each cell can include 9 bins oriented histogram; hence, 36-bin oriented histogram for a block. For a 32×64 window, the vector size is 2340. A SVM can use a linear kernel function. The number of support vectors varies between 50-150 for different sequences. In some implementations, the value for the sliding window is 30 frames. Some implementations can manually label the first 10 frames as the initialization for the two trackers. In some implementations, the Bayesian inference framework can generate 600 particles. In test runs, the combined tracker runs at around 2 fps on a P4 2.8 GHz dual core PC with testing sequences including 320×240 graylevel images.

During co-training, each learner can label the unlabeled data on which it makes a confident prediction based on its own knowledge. For this purpose, a threshold is needed for each learner. For the generative model, we set a threshold based on the log likelihood in Eq. 2. To be more conservative, we can use a second criteria: we find several local optima in the posterior distribution and if ratio ρ between the second optimum and the global optimum is small enough (ρ0.7), we accept the global optimum as a positive sample and all other samples that far enough from the global optimum are negative samples. For the discriminative model, due to the very limited training data, the positive and negative training data are usually well separated. We can select the confidence threshold so that at most 80% positive samples' confidence is above that threshold. In some implementaitons, this threshold is updated every 30 frames. The positive and negative samples labeled by the generative model may not be added to the discriminative model unless they are close to the decision boundary. To express the SVM confidence as a probability, we use a method to fit a sigmoid function that is updated every 30 frames.

We compare our co-trained tracker technologies with two generative methods, including (G1) IVT and our multiple linear subspaces (G2) algorithm and three discriminative methods, including online selection of discriminative color (D1) [10], our online SVM method (D2) and ensemble tracking (E.T). G1 uses a single 15D linear subspace and updates it incrementally. Note that D1 does not consider tracking with large scale change and rotation. G1, G2, D2 and the co-trained tracker use the same parameters in CONDENSATION algorithm, but G1, G2 and D2 use self-learning to update their models.

We compare these methods with challenging data sets, which contain image sequences of various types of object, including face (seq1-seq2), human (seq3-seq5) and vehicle (seq6). The challenging conditions include significant illumination changes (seq1), abrupt camera motion and significant motion blur (seq2-seq5), viewpoint changes and/or pose variations (seq3-seq6), and also occlusions (seq4-seq6). To compare the robustness under the challenging conditions, we show how many frames these methods can track the objects before tracking failure, e.g., after this frame a tracker cannot recover without re-initialization.

TABLE 1

| | Frames | Occlusion | G1 | G2 | D1* | D2 | E.T. | Ours |
|---|---|---|---|---|---|---|---|---|
| Seq1 | 761 | 0 | 17 | 261 | n/a | 491 | 94 | 769 |
| Seq2 | 313 | 0 | 75 | 282 | 313 | 214 | 44 | 313 |
| Seq3 | 140 | 0 | 11 | 15 | 6 | 89 | 22 | 140 |
| Seq4 | 338 | 93 | 33 | 70 | 8 | 72 | 118 | 240 |
| Seq5 | 184 | 30 | 50 | 5 | 50 | 50 | 53 | 154 |
| Seq6 | 945 | 143 | 163 | 506 | n/a | 54 | 10 | 802 |

Table 1 shows the comparison between different methods: G1:IVT, G2: incremental learning multiple subspaces, D1: online selection of discriminative color features [10], D2: online SVM, ensemble tracking (E.T.). D1 uses color information, which is not available for Seq1 and Seq6. The number of frames and the number of frames where occlusion happens in each sequence are also shown in Table 1. The comparison demonstrates that the co-trained tracker performs more robustly than other methods. Note that D1 requires color information, thus it cannot process some sequences, which are indicated with "n/a."

Figures 7A, 7B:
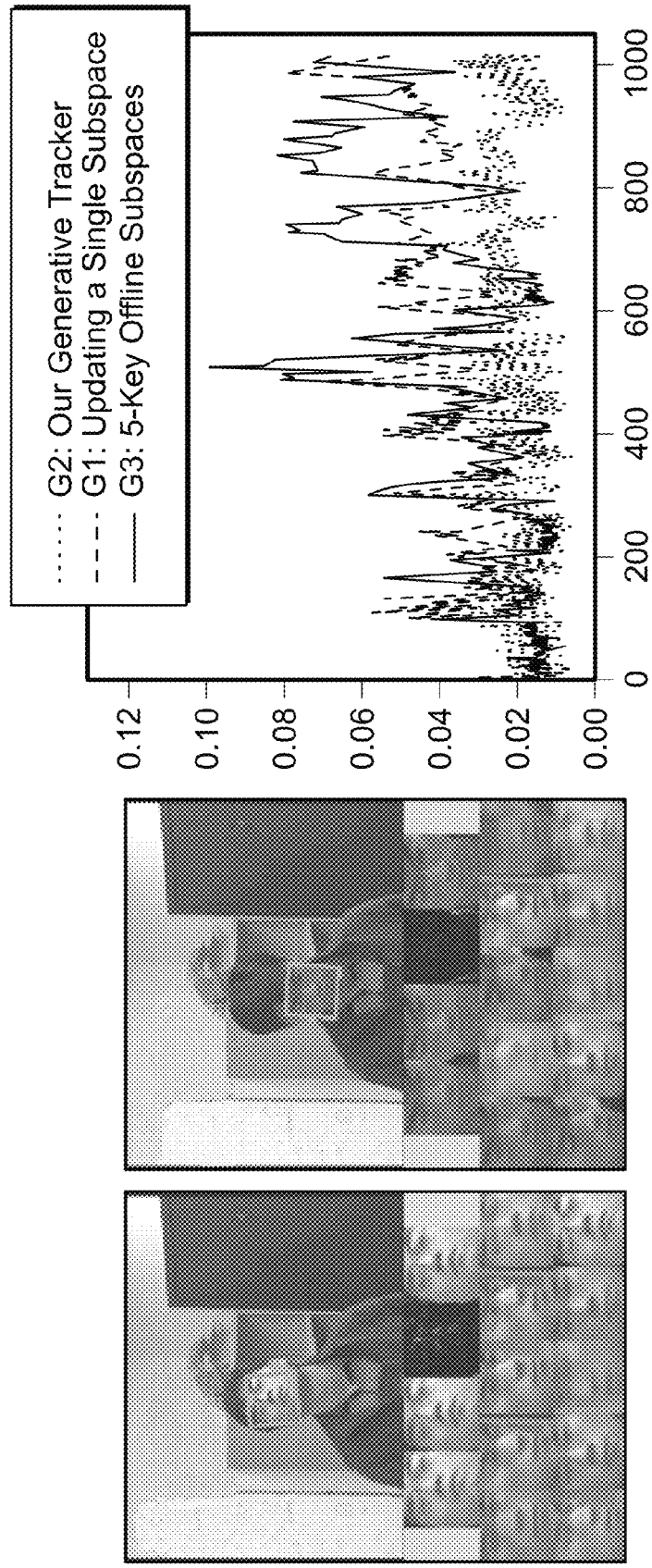
FIG. 7A shows an indoor tracking example using an online co-training architecture.
FIG. 7B show comparisons between different tracking techniques for a tracking scenario.

FIGS. 7A, 7B, 7C, 7D show different tracking examples using an online co-training architecture. In FIGS. 7A-7D, the tracked objects and part of negative samples are bounded with boxes. Some box indicate that none of the models are updated in a specific frame. In some implemtations, the co-trained tracker may have better self-awareness of current tracking performance and can safely enlarge the search range (by changing the diffusion dynamics) without being confused by distracters in the background. Also, the co-trained tracker successfully avoids drifting caused by varying viewpoints and illumination changes. FIG. 7A shows tracking and reacquisition with abrupt motion and blue. FIG. 7B shows tracking a human with clutter background and distracters. FIG. 7C shows tracking and reacquisition of an object during a long occlusion period. FIG. 7D shows an tracking and reacquisition example with long occlusion and clutter background.

FIG. 7A shows an indoor tracking example using an online co-training architecture. Here, the indoor sequence exhibits significant head pose variations. FIG. 7B show comparisons between different tracking techniques for a tracking scenario. We also compare our generative tracker G2 with G1 and another generative method G3, in indoor environments with few distracters. G3 uses 5 key 10D subspaces (corresponding to front, left profile, right profile, up and down), which are trained offline by manually labelling 150 samples into 5 categories; our generative method G2 uses at most 10 subspaces and each new subspace starts from 4-dimensions.

We calculate projection errors of several methods (average of multiple runs) within 1000 frames before the other two trackers start to drift. Offline 5-key subspaces method shows large projection errors at some frames where the poses are not covered in offline samples. G1 is not able to adapt rapidly to new appearance variations after running a long sequence. Our generative method G2 can promptly adapt to appearance variations and show smaller projection errors consistently, though each subspace in our generative track has much smaller dimensionality than the other two methods. The online trained subspaces can approximately represent the poses that have been observed, though we do not train offline in different poses.

A video tracking system can include a co-training framework to combine one global generative tracker and one local discriminate tracker. A generative tracker can build a compact representation of the complete appearance of an object by online learning a number of local linear subspaces. A discriminative tracker can use an online SVM algorithm to focus on local appearance of the object. By co-training, the two trackers can train each other on-the-fly with limited initialization, e.g., limited labeled data, and can learn an appearance model, which can be used to reacquire the object. Some implementations can combine online training with offline training. Some implementations can include one or more collaborative part-based trackes using the co-training framework to deal with partial occlusions. The co-training framework can include an online building appearance model for unknown types of objects.

Figure 8A:
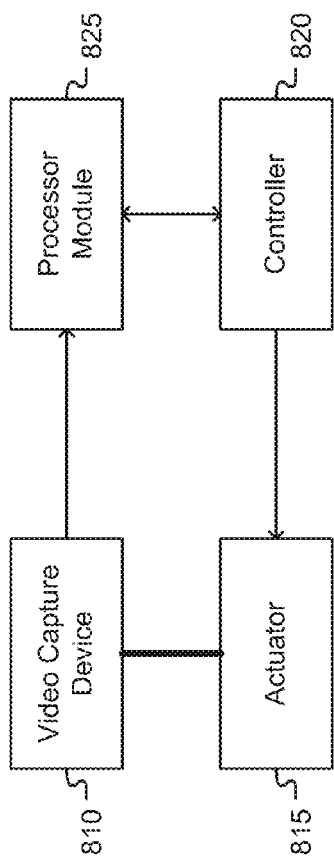
FIG. 8A, 8B show different examples of video tracking systems.

FIG. 8A shows an example of a video tracking system. The video tracking system can incorporate a co-training framework to track one or more objects. The video tracking system can include one or more of the following: a video capture device 810 such as a video camera or an imaging device, an actuator 815, a controller 820 to control the actuator 815, and a processor module 825 to run a co-training framework. The actuator 815 can mechanically move the video capture device 810 in space and time. The processor module 825 can include one or more processors to run the co-training framework and one or more threads or processes. In some implementations, the processor module 825 can include the controller 820.

Figure 8B:
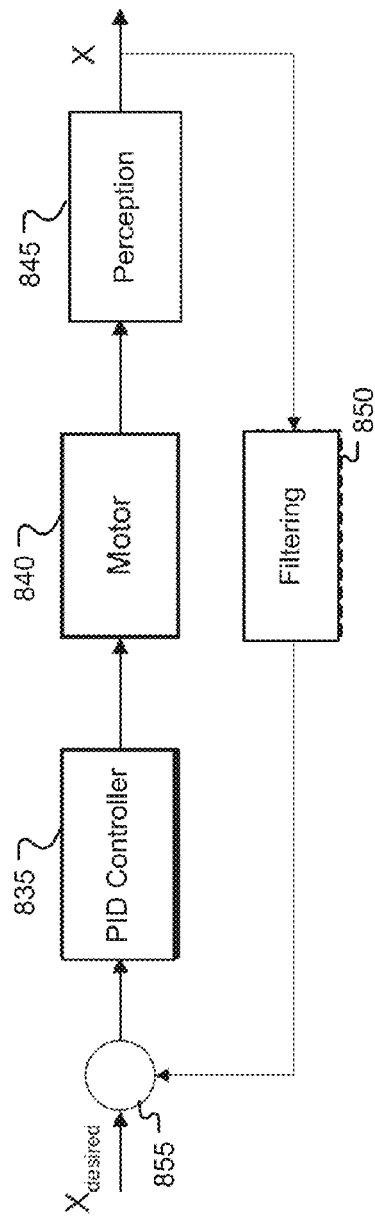

FIG. 8B shows a different example of a video tracking system such an active tracking system. The system can include an active monocular tracking system to keep an object centered in the image plane. The system can include a perception module 845 and a pan-tilt-zoom unit (PTZ-U). The visual perception module 845, which can include an incremental co-training algorithm, is responsible for the estimation of the target 2D position, size and orientation such as an orientated bounding box in the present image. The closed loop controller such as PID controller 835 can receive information from the PTZ-U and can determine the appropriate control signals for the tracking.

If the kinematical model of the target is known, filtering techniques can be applied to improve the perception results together with uncertainty estimates. A filtering module 850 can process an output of the perception module 845 to adjust, via an adjustment node 855, information used in the closed loop such as a state vector. The target state vector is defined as position and velocity of the target center and the scale and the scale change of the target in the 2D image plane:

$$X(k)=[u(k),v(k),u'(k),v'(k),s(k),s'(k)]$$

At each frame we observed that Y(k)=[u(k), v(k), s(k)] and the state equation and observation equation can be written as $$\begin{cases} X(k+1) = AX(k) + BU(k) + v(k) \\ Y(K+1) = HX(k) + w(k) \end{cases}$$

where v(k) and w(k) are Gaussian white noise. The system can use a Kalman filter to determine the estimated state of the target. The error vector e(k) can represent the difference between the estimated state and the reference state $[C_x, C_y, S]$ (where $C_x$ and $C_y$ are the center of the image, S is a desired size of the target). A PID controller 835 can use the error vector. For a given error vector, a compensator f(x) is a function that outputs the task space velocity command.

In some implementations, a PID controller can be defined as $$[\Delta \text{pan}, \Delta \text{tilt}, \Delta \text{zoom}] = k_p \left( \sum^n f(e_{k-i}) + K_d(f(e_{k-i}) - f(e_{k-i})) \right)$$

A typical problem in vision based control is a delay introduced by image processing algorithms. Visual processing may require a substantial amount of time when compared with the control loop. An execution unit such as a motor may require a period of time to perform an action. Communication, for example, between a network camera and a processing device, may delay the transferring a command. A technique for alleviating the effects of such a delay can include using predictive techniques, for example prediction using Kalman filter, to cancel the delay with the feedback loop. Another technique is based on a known active system and uses modeling of the inversion of the system to build a feedforward loop. This can accelerate the respond speed of the whole system by reducing the dependency on the feedback loop.

Figure 9:
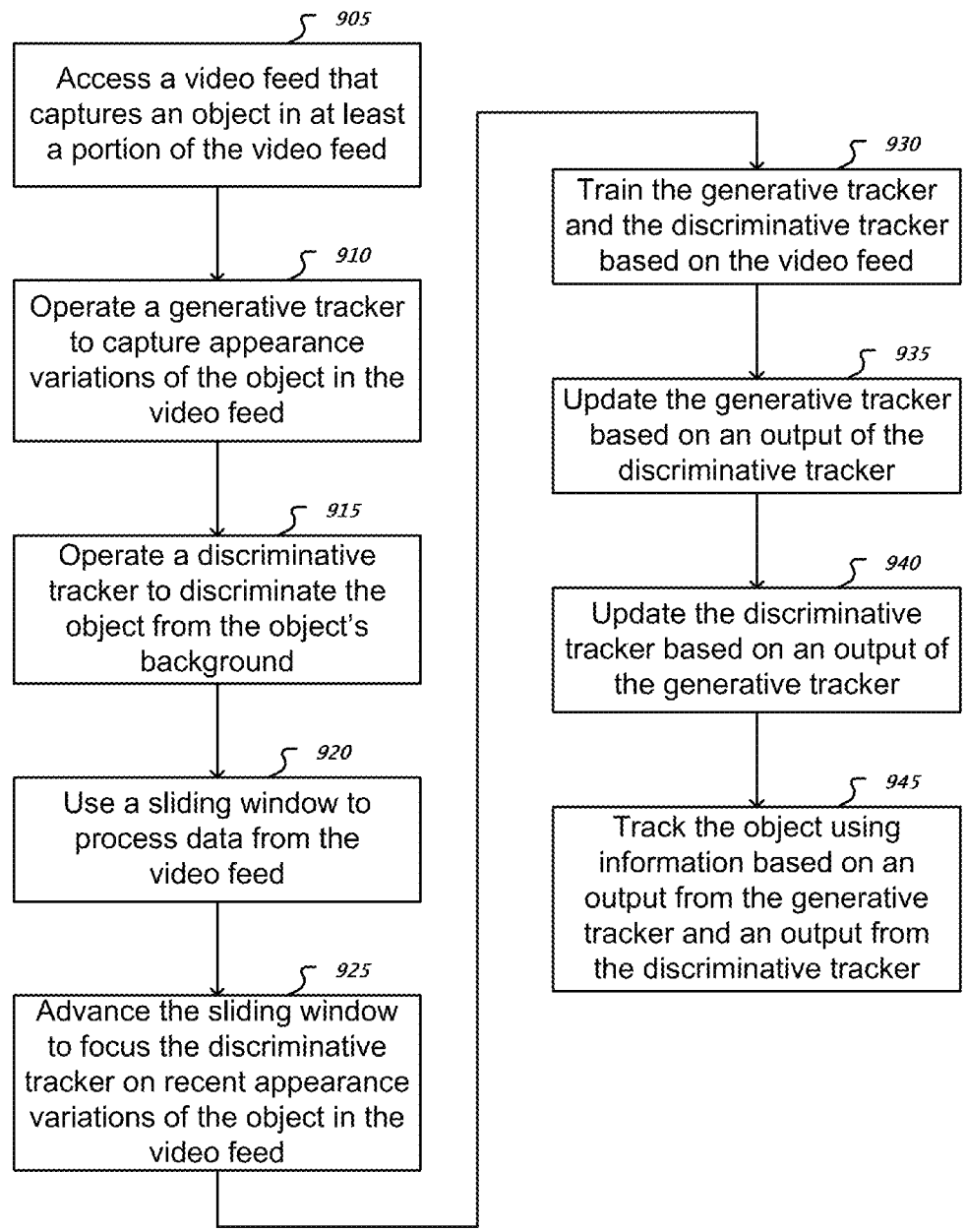
FIG. 9 shows an example of co-training two trackers.

FIG. 9 shows an example of co-training two trackers. A co-training technique can access 905 a video feed that captures an object in at least a portion of the video feed to operate 910 a generative tracker to capture appearance variations of the object in the video feed and to operate 915 a discriminative tracker to discriminate the object from the object's background. In some implementations, operating a generative tracker can include generating subspaces, using samples of the video feed, to represent appearance variations of the object in the video feed; determining similarities between the subspaces; and selectively merging two or more of the subspaces based on an output of the determination to reduce a number of subspaces representing the object. Operating a discriminative tracker can including using 920 a sliding window to process data from the video feed and advancing 925 the sliding window to focus the discriminative tracker on recent appearance variations of the object in the video feed. The technique can include training 930 the generative tracker and the discriminative tracker based on the video feed. Training can include updating 935 the generative tracker based on an output of the discriminative tracker and updating 940 the discriminative tracker based on an output of the generative tracker. Implementations can track 945 the object using information based on an output from the generative tracker and an output from the discriminative tracker. In some implementations, the information can include position, size, and rotation information derived from a Bayesian combination of likelihood functions corresponding to the different models.

Some implementations can use a Bayesian framework to combine outputs of the generative tracker and discriminative tracker and can generate object information corresponding to the object based on the combined outputs. Tracking an object can include using the object information. In some implementations, a controller uses information based on the object information to drive actuator to move a video capture device in space and time. The object information can include position, size, and rotation information.

Figure 10:
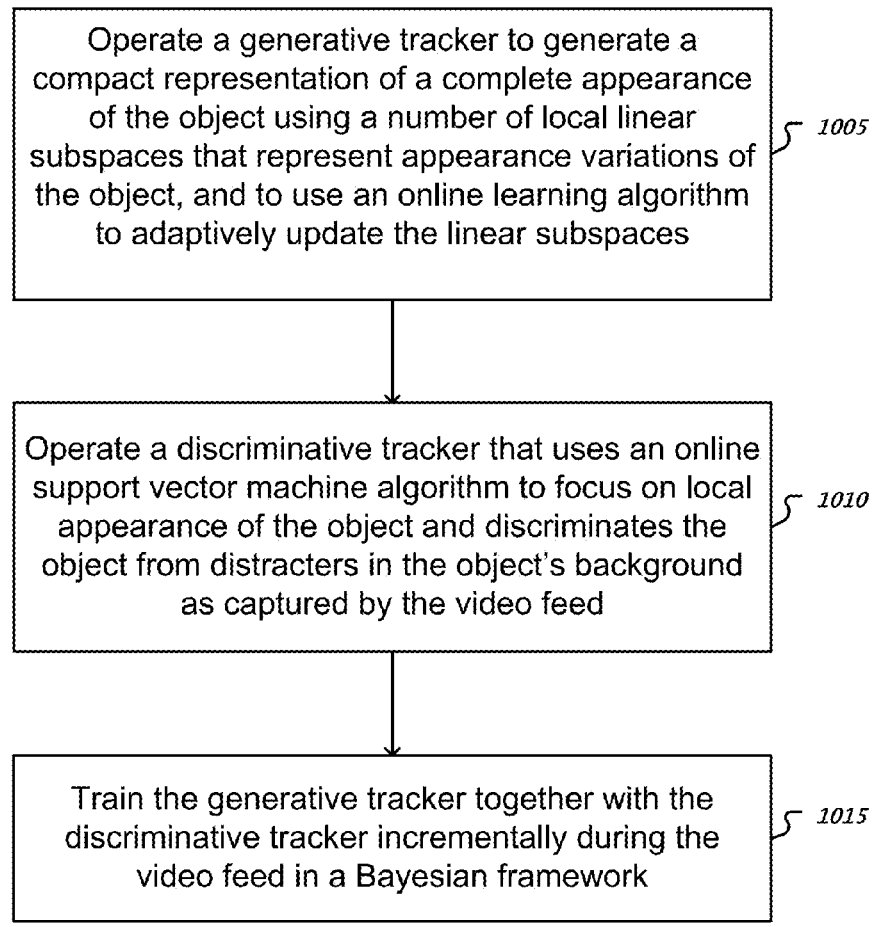
FIG. 10 shows a different example of co-training two trackers.

FIG. 10 shows a different example of co-training two trackers. In some implementations, a co-training technique can operate 1005 a generative tracker to generate a compact representation of a complete appearance of the object using a number of local linear subspaces that represent appearance variations of the object, and to use an online learning algorithm to adaptively update the linear subspaces. The technique can operate 1010 a discriminative tracker that uses an online support vector machine (SVM) algorithm to focus on local appearance of the object and discriminates the object from distracters in the object's background as captured by the video feed. The technique can train 1015 the generative tracker together with the discriminative tracker incrementally during the video feed in a Bayesian framework.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, near-tactile, or tactile input.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this patent application contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Only a few examples and implementations are disclosed. Variations, modifications, and enhancements to the described examples and implementations and other implementations can be made based on what is disclosed.

What is claimed is:

1. A computer implemented method for object tracking, comprising accessing a video feed that captures an object in at least a portion of the video feed;

co-training separate appearance models with the video feed, the models comprise a generative model to capture appearance variations of the object in the video feed and a discriminative model to discriminate the object from the object's background as captured by the video feed;

using a sliding window to process data from the video feed;

advancing the sliding window to focus the discriminative model on recent appearance variations of the object in the video feed;

generating object information corresponding to the object based a Bayesian framework that combines likelihood function outputs corresponding to the generative model and the discriminative model;
updating the generative model and the discriminative model using the object information; and
tracking the object based on the object information.

2. The method of claim 1, wherein the object information comprises position, size, and rotation information.

3. A computer implemented method for object tracking, comprising:
accessing a video feed that captures an object in at least a portion of the video feed;
operating a generative tracker to capture appearance variations of the object in the video feed;
operating a discriminative tracker to discriminate the object from the object's background as captured by the video feed, wherein operating the discriminative tracker comprises using a sliding window to process data from the video feed, and advancing the sliding window to focus the discriminative tracker on recent appearance variations of the object in the video feed; and
training the generative tracker and the discriminative tracker based on the video feed, wherein the training comprises updating the generative tracker based on an output of the discriminative tracker, and updating the discriminative tracker based on an output of the generative tracker; and
tracking the object with information based on an output from the generative tracker and an output from the discriminative tracker.

4. The method of claim 3, further comprising:
operating the discriminative tracker to use information based on an output of the generative tracker to reacquire the object in the video feed after an occlusion of the object in video feed or change in viewpoint or illumination of the video feed; and
operating the generative tracker to use information based on an output of the discriminative tracker to focus on the object.

5. The method of claim 3, wherein operating the generative tracker comprises:
generating a compact representation of a complete appearance of the object based on linear subspaces to represent appearance variations of the object, wherein the linear subspaces are updated adaptively using an online learning algorithm.

6. The method of claim 3, wherein operating the generative tracker comprises:
generating subspaces, using samples of the video feed, to represent appearance variations of the object in the video feed;
determining similarities between the subspaces; and
selectively merging two or more of the subspaces based on an output of the determination to reduce a number of subspaces representing the object.

7. The method of claim 3, wherein operating the discriminative tracker comprises:
using an online support vector machine algorithm with local feature descriptors to focus on appearance variations of the object that occur within the sliding window.

8. The method of claim 7, wherein operating the discriminative tracker comprises:
updating an object model trained by the online support vector machine algorithm based on samples of the video feed; and
removing samples that fall outside of the sliding window from consideration by the online support vector machine algorithm.

9. The method of claim 3, further comprising:
using a Bayesian framework to combine outputs of the generative tracker and discriminative tracker; and
generating object information corresponding to the object based on the combined outputs, wherein tracking the object comprises using the object information.

10. The method of claim 9, further comprising:
operating a video capture device to generate the video feed; and
using the object information to control the video capture device to follow the object.

11. The method of claim 9, wherein the object information comprises position, size, and rotation information.

12. A computer program product, encoded on a non-transitory computer-readable medium, operable to cause data processing apparatus to perform operations comprising:
accessing a video feed that captures an object in at least a portion of the video feed;
operating a generative tracker to capture appearance variations of the object in the video feed;
operating a discriminative tracker to discriminate the object from the object's background as captured by the video feed, wherein operating the discriminative tracker comprises using a sliding window to process data from the video feed, and advancing the sliding window to focus the discriminative tracker on recent appearance variations of the object in the video feed; and
training the generative tracker and the discriminative tracker based on the video feed, wherein the training comprises updating the generative tracker based on an output of the discriminative tracker, and updating the discriminative tracker based on an output of the generative tracker; and
tracking the object with information based on an output from the generative tracker and an output from the discriminative tracker.

13. The computer program product of claim 12, wherein the operations further comprise:
operating the discriminative tracker to use information based on an output of the generative tracker to reacquire the object in the video feed after an occlusion of the object in video feed or change in viewpoint or illumination of the video feed; and
operating the generative tracker to use information based on an output of the discriminative tracker to focus on the object.

14. The computer program product of claim 12, wherein operating the generative tracker comprises:
generating a compact representation of a complete appearance of the object based on linear subspaces to represent appearance variations of the object, wherein the linear subspaces are updated adaptively using an online learning algorithm.

15. The computer program product of claim 12, wherein operating the generative tracker comprises:
generating subspaces, using samples of the video feed, to represent appearance variations of the object in the video feed;
determining similarities between the subspaces; and
selectively merging two or more of the subspaces based on an output of the determination to reduce a number of subspaces representing the object.

16. The computer program product of claim 12, wherein operating the discriminative tracker comprises:

using an object model trained by an online support vector machine algorithm with local feature descriptors to focus on appearance variations of the object that occur within the sliding window.

17. The computer program product of claim 16, wherein operating the discriminative tracker comprises:
updating the online support vector machine algorithm based on samples of the video feed; and
removing samples that fall outside of the sliding window from consideration by the online support vector machine algorithm.

18. The computer program product of claim 12, wherein the operations further comprise:
using a Bayesian framework to combine outputs of the generative tracker and discriminative tracker; and
generating object information corresponding to the object based on the combined outputs, wherein tracking the object comprises using the object information.

19. The computer program product of claim 18, wherein the operations further comprise:
operating a video capture device to generate the video feed; and
using the object information to move the video capture device.

20. The computer program product of claim 18, wherein the object information comprises position, size, and rotation information.

21. A system comprising:
a video capture device to generate a video feed;
processor module, in communication with the video capture device, configured to perform operations comprising:
accessing the video feed, wherein the video feed captures an object in at least a portion of the video feed;
operating a generative tracker to capture appearance variations of the object in the video feed;
operating a discriminative tracker to discriminate the object from the object's background as captured by the video feed, wherein operating the discriminative tracker comprises using a sliding window to process data from the video feed, and advancing the sliding window to focus the discriminative tracker on recent appearance variations of the object in the video feed; and
training the generative tracker and the discriminative tracker based on the video feed, wherein the training comprises updating the generative tracker based on an output of the discriminative tracker, and updating the discriminative tracker based on an output of the generative tracker; and
tracking the object with information based on an output from the generative tracker and an output from the discriminative tracker.

22. The system of claim 21, wherein the operations further comprise:
operating the discriminative tracker to use information based on an output of the generative tracker to reacquire the object in the video feed after an occlusion of the object in video feed or change in viewpoint or illumination of the video feed; and
operating the generative tracker to use information based on an output of the discriminative tracker to focus on the object.

23. The system of claim 21, wherein operating the generative tracker comprises:
generating a compact representation of a complete appearance of the object based on linear subspaces to represent appearance variations of the object, wherein the linear subspaces are updated adaptively using an online learning algorithm.

24. The system of claim 21, wherein operating the generative tracker comprises:
generating subspaces, using samples of the video feed, to represent appearance variations of the object in the video feed;
determining similarities between the subspaces; and
selectively merging two or more of the subspaces based on an output of the determination to reduce a number of subspaces representing the object.

25. The system of claim 21, wherein operating the discriminative tracker comprises:
using an object model trained by an online support vector machine algorithm with local feature descriptors to focus on appearance variations of the object that occur within the sliding window.

26. The system of claim 25, wherein operating the discriminative tracker comprises:
updating the online support vector machine algorithm based on samples of the video feed; and
removing samples that fall outside of the sliding window from consideration by the online support vector machine algorithm.

27. The system of claim 21, wherein the operations further comprise:
using a Bayesian framework to combine outputs of the generative tracker and discriminative tracker; and
generating object information corresponding to the object based on the combined outputs, wherein tracking the object comprises using the object information.

28. The system of claim 27, wherein the operations further comprise:
operating a video capture device to generate the video feed; and
using the object information to move the video capture device.

29. The system of claim 27, wherein the object information comprises position, size, and rotation information.

30. The system of claim 21, further comprising:
an actuator to move the video camera in space; and
a controller to operate the actuator and in communication with the processor module,
wherein the operations further comprise operating the controller to move the video camera to track the object using an output of the generative tracker and an output of the discriminative tracker.

31. A computer implemented method for object tracking, comprising:
obtaining a video feed that captures an object;
operating a generative tracker to generate a compact representation of a complete appearance of the object using a number of local linear subspaces that represent appearance variations of the object, wherein the linear subspaces are updated adaptively using an online learning algorithm;
operating a discriminative tracker that uses an online support vector machine (SVM) algorithm to focus on local appearance of the object and discriminates the object from distracters in the object's background as captured by the video feed;
training the generative tracker together with the discriminative tracker incrementally during the video feed in a Bayesian framework; and
tracking the object using the generative tracker and the discriminative tracker.

32. A system for tracking an object, comprising:
a video camera that generates a video feed;
a controller to move the video camera in space; and
a processor to execute instructions comprising:
  obtaining the video feed, wherein the video feed captures an object;
  operating a generative tracker to generate a compact representation of a complete appearance of the object using a number of local linear subspaces that represent appearance variations of the object, wherein the linear subspaces are updated adaptively using an online learning algorithm;
  operating a discriminative tracker that uses an online support vector machine (SVM) algorithm to focus on local appearance of the object and discriminates the object from distracters in the object's background as captured by the video feed;
  training the generative tracker together with the discriminative tracker incrementally during the video feed in a Bayesian framework; and
  generating instructions for the controller using the generative tracker and the discriminative tracker, wherein the instructions comprise instructions to move the video camera such that the video camera tracks the object, wherein the controller is responsive to the generated instructions.

* * * * *